United States Patent [19]
Eguchi et al.

[11] Patent Number: 5,150,764
[45] Date of Patent: * Sep. 29, 1992

[54] VEHICLE REAR WHEEL STEER ANGLE CONTROL SYSTEM

[75] Inventors: Takaaki Eguchi, Isehara; Yuzo Sakita, Machida, both of Japan

[73] Assignee: Nissan Motor Co., Ltd., Yokohama, Japan

[ * ] Notice: The portion of the term of this patent subsequent to Aug. 7, 2007 has been disclaimed.

[21] Appl. No.: 593,269

[22] Filed: Oct. 1, 1990

Related U.S. Application Data

[63] Continuation of Ser. No. 284,414, Dec. 14, 1988, abandoned.

[30] Foreign Application Priority Data

Dec. 28, 1987 [JP] Japan ................... 62-330281

[51] Int. Cl.⁵ .................................. B62D 5/04
[52] U.S. Cl. ................... 180/141; 180/142; 364/424.01
[58] Field of Search ........... 180/140, 141, 142, 143, 180/79.1, 79; 280/91; 364/424.01, 424.05; 74/388 PS; 60/385, 386; 91/536, 386; 92/7, 131, 117 R

[56] References Cited
U.S. PATENT DOCUMENTS

| | | | |
|---|---|---|---|
| 3,866,706 | 2/1975 | Lincke et al. | 180/142 |
| 4,418,780 | 12/1983 | Ito et al. | 180/142 |
| 4,441,572 | 4/1984 | Ito et al. | 180/140 |
| 4,666,013 | 5/1987 | Shibahata et al. | 180/141 |
| 4,878,557 | 11/1989 | Shibahata et al. | 180/142 |
| 4,947,327 | 8/1990 | Kawagoe | 180/141 |

FOREIGN PATENT DOCUMENTS

| | | |
|---|---|---|
| 59-67170 | 4/1984 | Japan . |
| 59-186774 | 10/1984 | Japan . |
| 60-229873 | 11/1985 | Japan . |
| 2151997 | 7/1985 | United Kingdom . |
| 2173460 | 10/1986 | United Kingdom . |

*Primary Examiner*—Andres Kashnikow
*Assistant Examiner*—Richard Camby
*Attorney, Agent, or Firm*—Foley & Lardner

[57] ABSTRACT

A vehicle rear wheel steering control system includes a steering actuator for varying an actual rear wheel steer angle in accordance with a control signal, a steering input sensor, and a controller for producing the control signal in accordance with the steering input. The controller has a first functional section for determining a first desired rear wheel steer angle so as to obtain a flat characteristic of a yaw rate gain with respect to a steering frequency, a second functional section for determining a second desired rear wheel steer angle in accordance with a steering acceleration, and a third functional section for adding the second desired rear wheel steer angle to the first desired rear wheel steer angle.

14 Claims, 9 Drawing Sheets

VEHICLE REAR WHEEL STEER ANGLE CONTROL SYSTEM

This application is a continuation of application Ser. No. 07/284,414, filed Dec. 14, 1988 now abandoned.

REFERENCES TO RELATED APPLICATIONS

The following, commonly assigned, recent U.S. patent applications relate to subject matter similar to that of the present invention. (1)- Ser. No. 196,217; filed on May 13, 1988 now U.S. Pat. No. 4,901,811; (2) Ser. No. 195,085; filed on May 17, 1988 now U.S. Pat. No. 4,947,328; (3) Ser. No. 195,078; filed on May 17, 1988 now U.S. Pat. No. 4,942,532; (4) Ser. No. 245,148; filed on Sep. 16, 1988 now U.S. Pat. No. 4,949,261; (5) Ser. No. 275,061; filed on Nov. 22, 1988 now U.S. Pat. No. 4,947,327 (6) Ser. No. 277,745, filed Nov. 30, 1988 now U.S. Pat. No. 4,947,326; (7) Ser. No. 277,744, filed Nov. 30, 1988 now U.S. Pat. No. 4,893,690; (8) Ser. No.

BACKGROUND OF THE INVENTION

The present invention relates to a rear wheel steering control system.

A rear wheel steering system is useful to provide a flat characteristic of a vehicle yaw rate versus a steering frequency of front wheels, and to produce a yaw rate in proportion to a steering angle $\theta$ independent of a steering speed with no phase lag.

One conventional example of such a rear wheel steering system is disclosed in Japanese Patent Provisional Publication No. 60-229873. This rear wheel steering system is arranged to steer the rear wheels so that the rear wheel steer angle $\delta_r$ is made equal to the algebraic sum of a proportional term obtained by multiplying the steering angle $\theta$ by a positive proportional constant K, and a first derivative term obtained by multiplying a steering angular speed $\dot{\theta}$ by a negative first derivative constant $\tau_1$ ($\delta_r = K\theta + \tau_1\dot{\theta}$).

When the steering angle $\theta$ is varied as shown in FIG. 7, this control system varies the proportional control quantity $K\theta$ and the derivative control quantity $\tau_1\dot{\theta}$ as shown by a dotted line and a one dot chain line in FIG. 7. As a result, the rear wheel steer angle $\delta_r$ is controlled as shown by a solid line a in each of FIGS. 7 and 8.

The control constants K and $\tau_1$ are so determined as to obtain a flat characteristic of the yaw rate gain. Therefore, an opposite-phase steering period $\Delta T_1$ during which the rear wheels are steered in the opposite direction to the steering direction of the front wheels is considerably long as shown in FIG. 8. This causes passengers of the vehicle to feel, at the beginning of a turn, the unnatural feeling that the rear end of the vehicle is swung in the direction opposite to the centripetal direction, and degrades riding comfort.

It is possible to meet this problem by decreasing the first derivative constant $\tau_1$. In this case, the rear wheel steer angle is controlled as shown by a dotted line b in FIG. 8, and the opposite-phase steering period is reduced from $\Delta T_1$ to $\Delta T_2$. However, the amount of the opposite-phase steering is decreased from $-\delta_{r1}$ to $-\delta_{r2}$ as shown in FIG. 8, and accordingly the response characteristic of the yaw is deteriorated.

SUMMARY OF THE INVENTION

It is an object of the present invention to provide a rear wheel steering control system which can decrease the opposite-phase steering period without decreasing the opposite-phase steering amount.

According to the present invention, a rear wheel steering control system of a vehicle comprises a steering actuator for varying an actual rear wheel steer angle of the vehicle in response to a control signal, and a controller for producing the control signal.

As schematically shown in FIG. 12, the controller comprises first operational means 101 for determining a first desired rear wheel steer angle so as to hold a yaw rate gain of the vehicle substantially constant, second operational means 102 for determining a second desired rear wheel steer angle in accordance with a steering acceleration, and third operational means 103 for adding the second desired rear wheel steer angle to the first desired rear wheel steer angle.

This control system can control the rear wheel steer angle so as to make flat the yaw rate gain characteristic with respect to the steering frequency, and produce the yaw rate in proportion to the steering amount independently of the steering speed without a phase lag. Furthermore, this control system adds the steer angle dependent on the steering acceleration to the rear wheel steer angle. With this additional steer angle, the control system can reduce the opposite-phase steering period without decreasing the opposite-phase steering amount.

The controller may further comprise differentiating means 104 for determining first and second derivatives of a steering input such as a steering wheel angle, means 105 for determining a proportional constant K, and a first derivative constant $\tau_1$, and means 106 for determining a second derivative constant $\tau_2$.

DETAILED DESCRIPTION OF THE INVENTION

Figure 1:
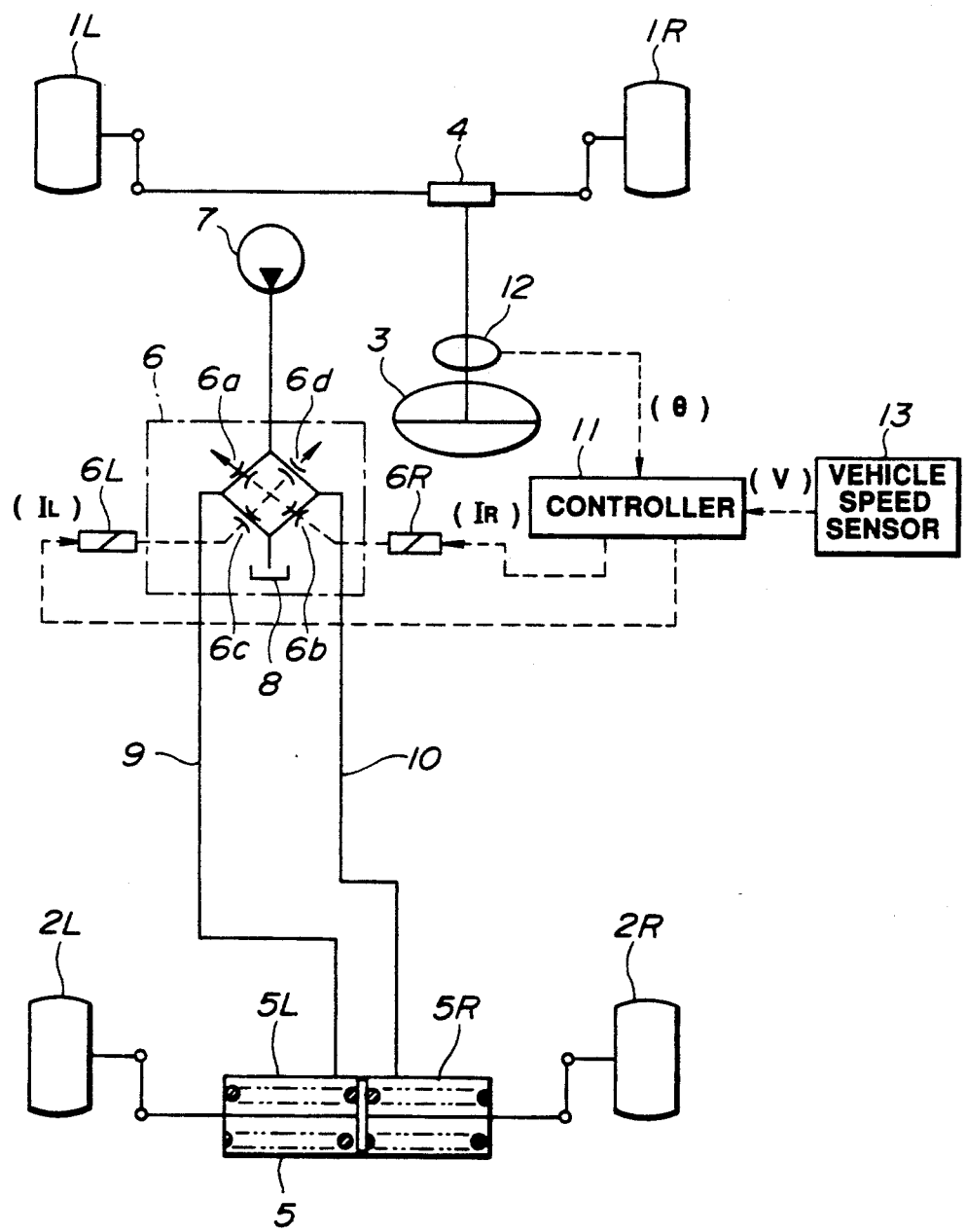
FIG. 1 is a schematic view of a four wheel steering vehicle for showing one embodiment of the present invention.

One embodiment of the present invention is shown in FIG. 1.

A four wheel steering vehicle shown in FIG. 1 includes left and right front wheels 1L and 1R, left and right rear wheels 2L and 2R, and a steering wheel 3. The front wheels 1L and 1R are connected with the steering wheel 3 through a steering gear 4 in a conventional manner. The rear wheels 2L and 2R are connected with a rear wheel steering actuator 5, so that the rear wheels 2L and 2R are also steerable.

The actuator 5 of this embodiment is a spring center type hydraulic actuator having left and right pressure chambers 5L and 5R. When a fluid pressure is supplied to the right chamber 5R, the actuator 5 steers the rear wheels 2L and 2R in the righthand direction through an angle proportional to the pressure. When the fluid pressure is supplied to the left chamber 5L, the actuator 5 steers the rear wheels 2L and 2R in the lefthand direction through an angle proportional to the pressure.

Figure 3:
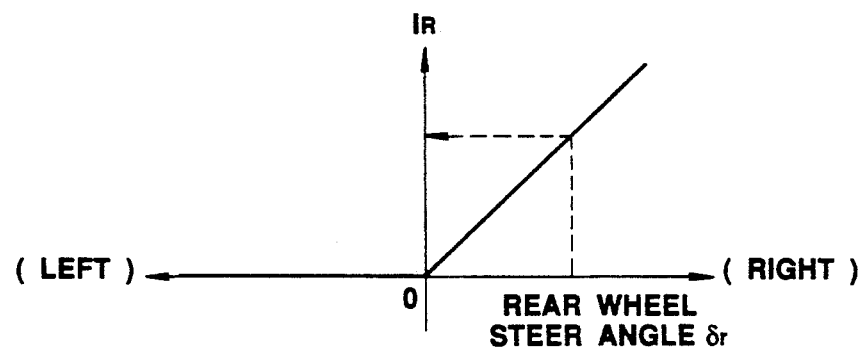
FIGS. 3 and 4 are graphs showing relationships between a rear wheel steer angle and right or left solenoid exciting current $I_R$ or $I_L$, used in the control system of FIG. 1.
Figure 4:
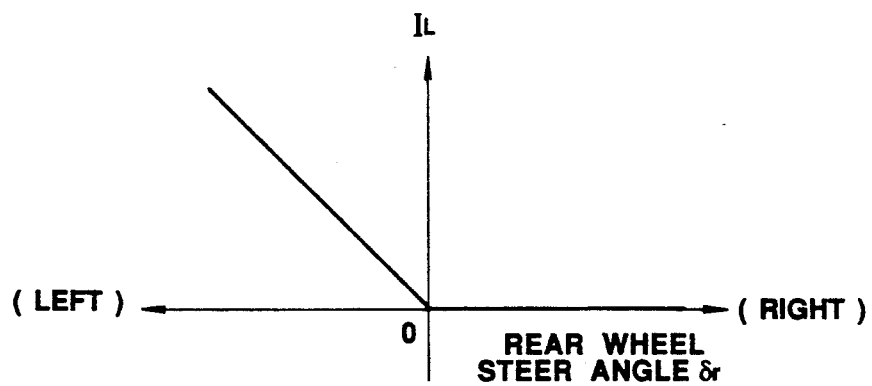

There is provided an electromagnetic proportional rear wheel steering control valve 6 for controlling the fluid pressure supplied to the actuator 5. The control valve 6 includes four variable orifices 6a, 6b, 6c and 6d, which are connected in a bridge circuit. This bridge circuit is connected with a pump 7, a reservoir 8, a left fluid passage 9 leading to the left pressure chamber 5L of the actuator 5, and a right fluid passage 10 leading to the right pressure chamber 5R of the actuator 5. The control valve 6 further includes left and right solenoids 6L and 6R. When both of the solenoids 6L and 6R are OFF, then the variable orifices 6a and 6b, and the variable orifices 6c and 6d are all fully opened, so that both of the pressure chambers 5L and 5R are put in a non-pressure state. When the solenoid 6L or 6R is energized by a current $I_L$ or $I_R$, the orifice pair 6c and 6d or the orifice pair 6a and 6b is closed to an opening degree corresponding to the magnitude of the exciting current, so that the fluid pressure corresponding to the current $I_L$ or $I_R$ is supplied to the pressure chamber 5L or 5R. In this way, a rear wheel steer angle $\delta_r$ of the rear wheels 2L and 2R is controlled in accordance with the currents $I_L$ and $I_R$, as shown in FIGS. 3 and 4.

Figure 2:
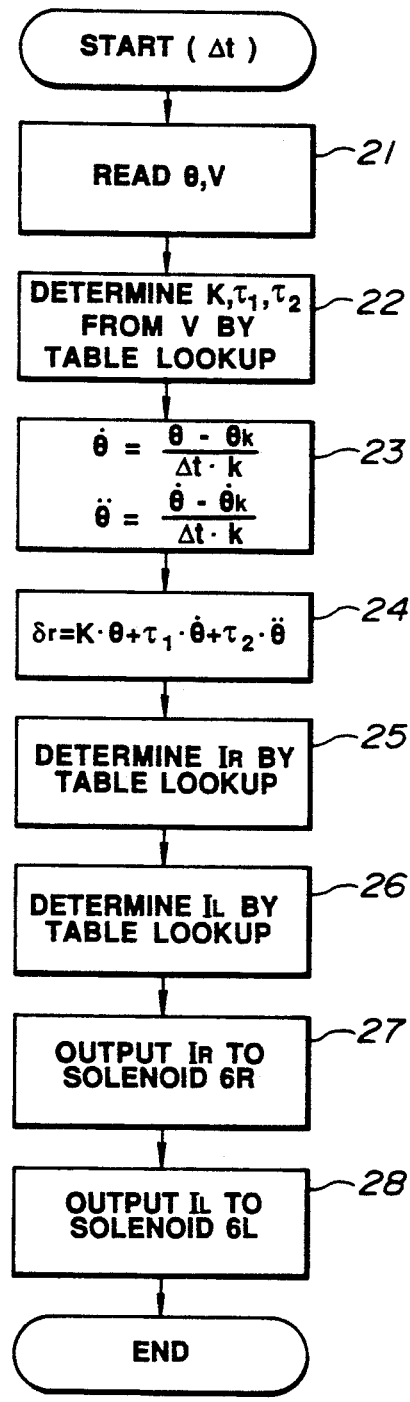
FIG. 2 is a flowchart performed by a controller 11 shown in FIG. 1.

A controller 11 is connected with the solenoids 6L and 6R for controlling the exciting currents $I_L$ and $I_R$. The controller 11 of this embodiment is connected with a steering input sensor 12 and a vehicle speed sensor 13. In this embodiment, the steering input sensor 12 is a steering angle sensor for sensing a steering wheel angle O of the vehicle. The vehicle speed sensor 13 senses a vehicle speed V of the vehicle. Output signals of the sensors 12 and 13 are inputted into the controller 11. The controller 11 controls the rear wheel steer angle in accordance with $\theta$ and V by regularly repeating a sequence of operations shown in FIG. 2 in a predetermined operating cycle $\Delta t$ (for example, 100 msec). The controller 11 starts the program shown in FIG. 2 each time the period $\Delta t$ elapses.

At step 21, the controller 11 reads the steering angle O and the vehicle speed V, which are sensed by the sensors 12 and 13.

At a next step 22, the controller 11 obtains values of proportional constant K, first derivative constant $\tau_1$, and second derivative constant $\tau_2$, corresponding to a current value of the vehicle speed V, from data tables stored in a memory section of the controller 11. The proportional constant K and the first derivative constant $\tau_1$ are so determined as to provide a flat characteristic of the vehicle yaw rate gain with respect to the steering frequency. The second derivative constant $\tau_2$ is characteristic of the present invention, and equal to or smaller than zero.

At a step 23, the controller 11 determines a steering angular speed $\dot{\theta}$ and a steering angular acceleration $\ddot{\theta}$. In this embodiment, the steering angular speed $\dot{\theta}$ is set equal to a fraction whose numerator is a difference between a current value $\theta$ of the steering angle obtained in the current operating cycle, and an old value $\theta_k$ of the steering angle which was obtained k cycles ago, and whose denominator is a product obtained by multiplying the cycle time $\Delta t$ by k.

$$\ddot{\theta}=(\dot{\theta}-\dot{\theta}_k)/\Delta t \cdot k$$

The steering acceleration $\ddot{\theta}$ is determined by dividing a difference between the current steering angular speed value $\dot{\theta}$ determined in the current cycle, and an old steering angular speed value $\dot{\theta}_k$ determined in the previous cycle k cycles ago, by $\Delta t$ times k.

$$\dot{\theta}=(\theta-\theta_k)/\Delta t \cdot k$$

At a step 24, the controller 11 determines the rear wheel steer angle $\delta_r$ by using the proportional constant K, the first derivative constant $\tau_1$, the second derivative constant $\tau_2$, the steering angle $\theta$, the steering angular speed $\dot{\theta}$ and the steering angular acceleration $\ddot{\theta}$, according to the following equation.

$$\delta_r = K \cdot \theta + \tau_1 \cdot \dot{\theta} + \tau_2 \cdot \ddot{\theta}$$

At steps 25 and 26, the controller 11 determines values of the solenoid exciting currents $I_R$ and $I_L$ required to achieve the rear wheel steer angle calculated at the step 24, by using data tables coresponding to the graphs shown in FIGS. 3 and 4. At steps 27 and 28, the controller 11 outputs the currents $I_R$ and $I_L$ determined at the steps 25 and 26, to the right and left solenoids 6R and 6L. Consequently, the rear wheels 2L and 2R are steered by the actuator 5, and the actual rear wheel steer angle is made equal to the calculated rear wheel steer angle.

Figure 5:
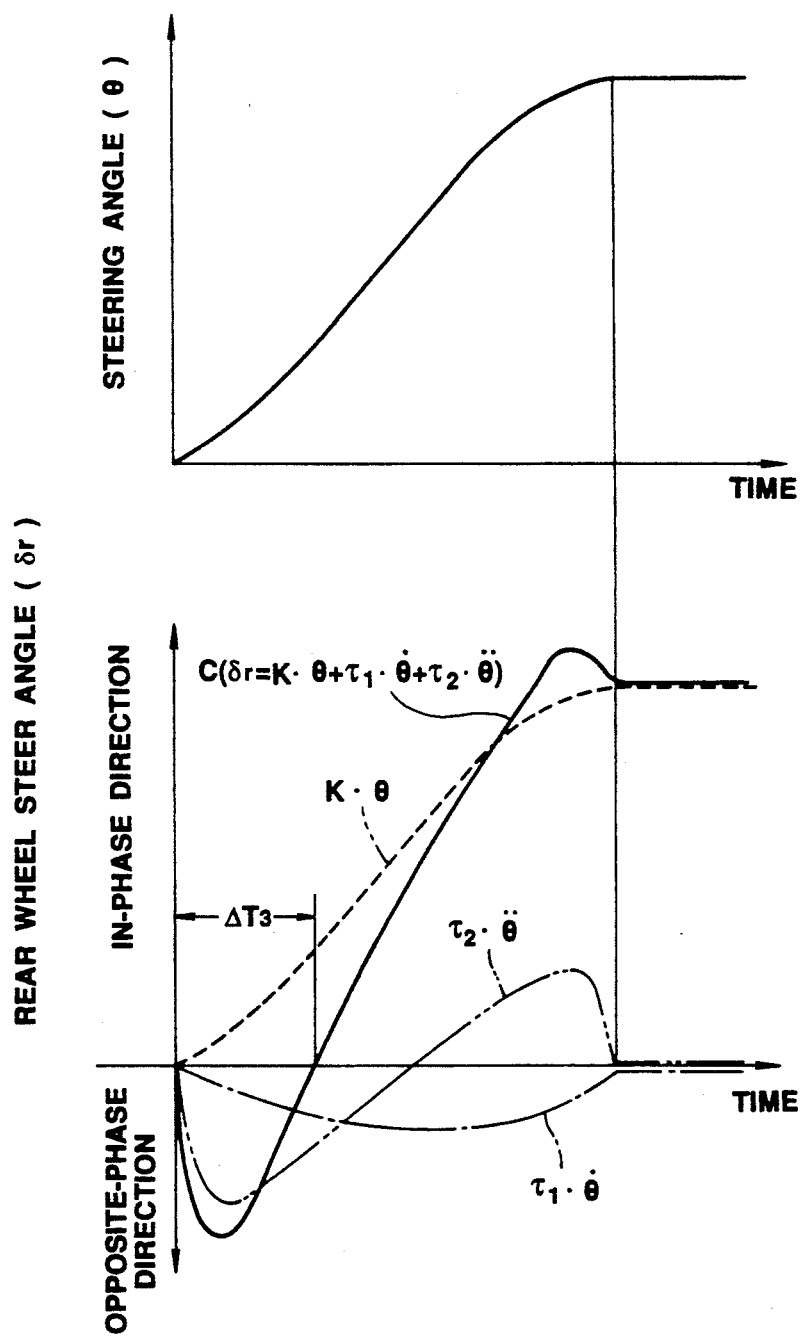
FIG. 5 is a time chart showing the rear wheel steer angle according to the control system of FIG. 1.

When the steering wheel angle $\theta$ is varied as shown in FIG. 5, the proportional term $K\theta$, the first derivative term $\tau_1\dot{\theta}$ and the second derivative term $\tau_2\ddot{\theta}$ of this control system vary as shown, respectively, by dotted line, one dot chain line, and two dot chain line in FIG. 5. The rear wheel steer angle $\delta_r$ which is the algebraic sum of the proportional term, the first derivative term and the second derivative term, varies as shown by a solid line c in FIG. 5.

Figure 6:
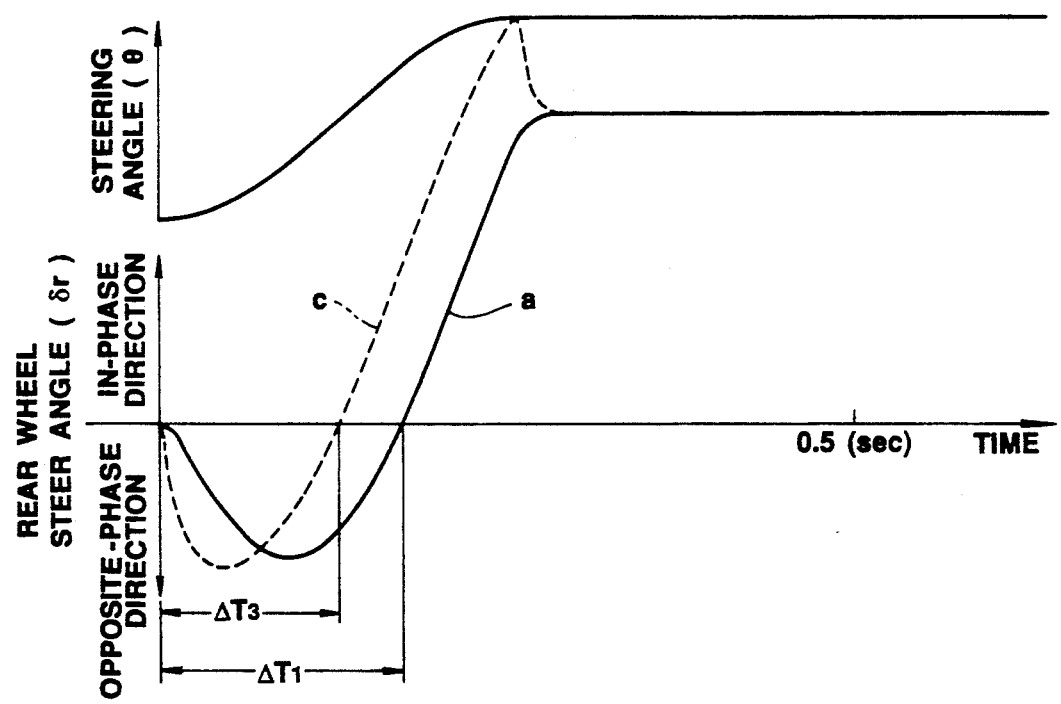
FIG. 6 is a time chart showing the rear wheel steer angle according to the control system of FIG. 1, in comparison with the result of a conventional control system.
Figure 7:
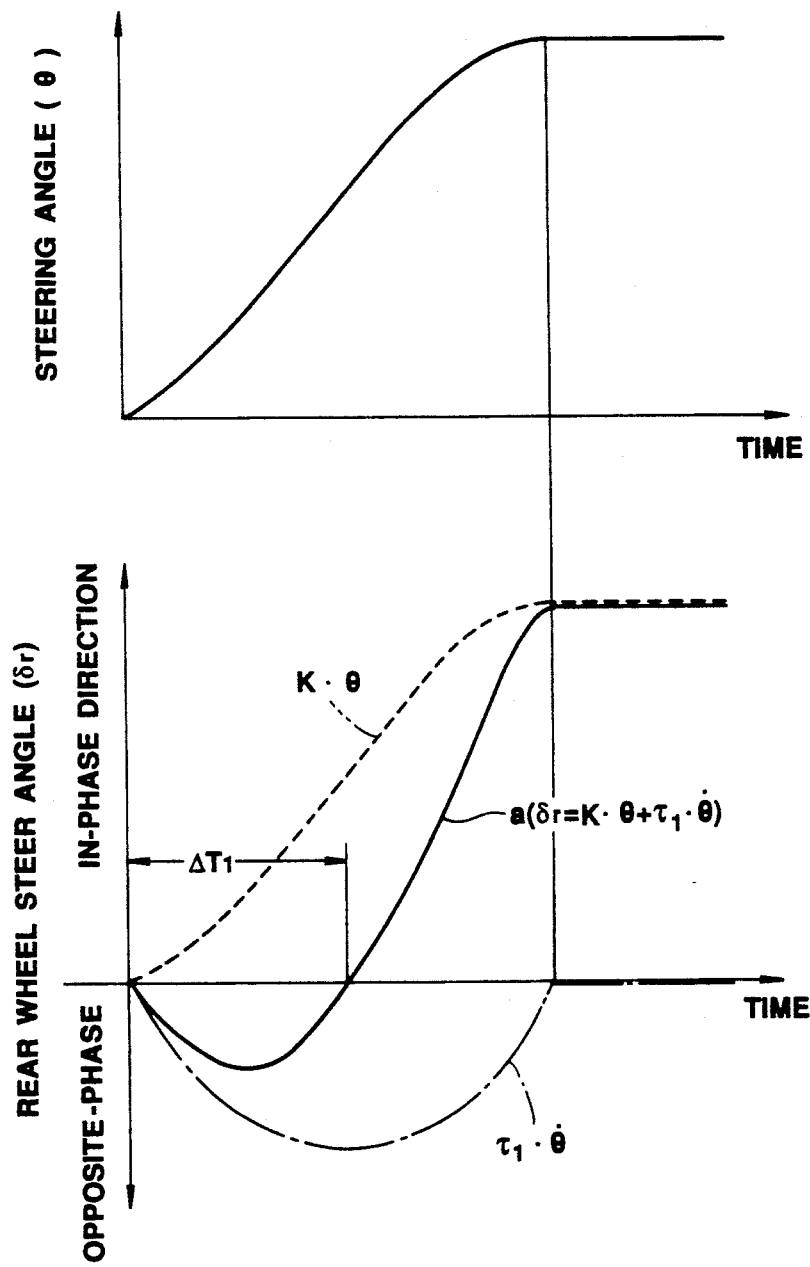
FIGS. 7 and 8 are time charts of the rear wheel steer angle according to the conventional control system.
Figure 8:
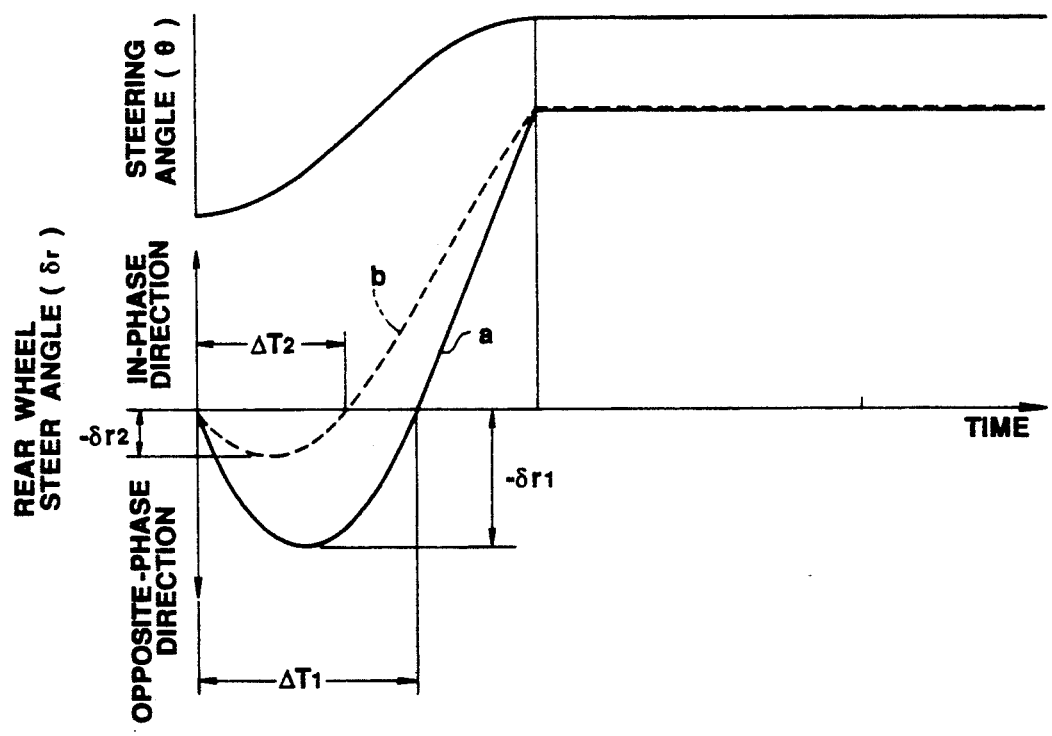

In FIG. 6, the curve c of FIG. 5 and the curve a of FIG. 7 are plotted in the same graph. As known from the comparison between the curves c and a in FIG. 6, the control system of this embodiment can decrease the opposite-phase steering period during which the rear wheels 2L and 2R are steered in the direction opposite to the steering direction of the front wheels 1L and 1R, from $\Delta T_1$ to $\Delta T_3$ without decreasing the amount of the opposite-phase steering of the rear wheels. In this way, the control system of this embodiment can lessens the unnatural feeling that the rear end of the vehicle is swung in the direction opposite to the centripetal direction, without deteriorating the response of the yawing motion.

Figure 9:
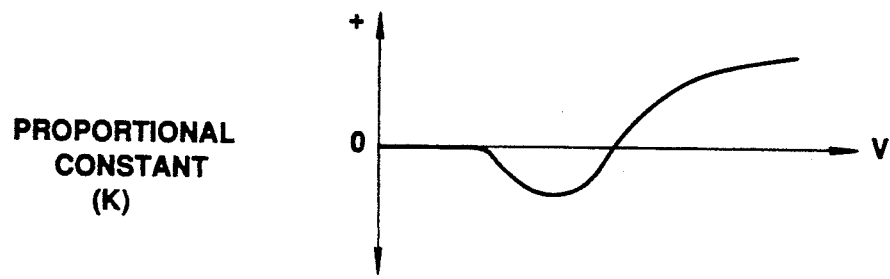
FIGS. 9, 10 and 11 are graphs showing vehicle speed dependent characteristics of proportional constant, first derivative constant and second derivative constant.
Figure 10:
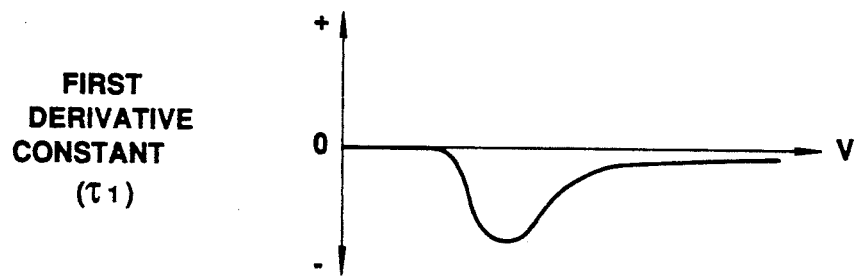
Figure 11:
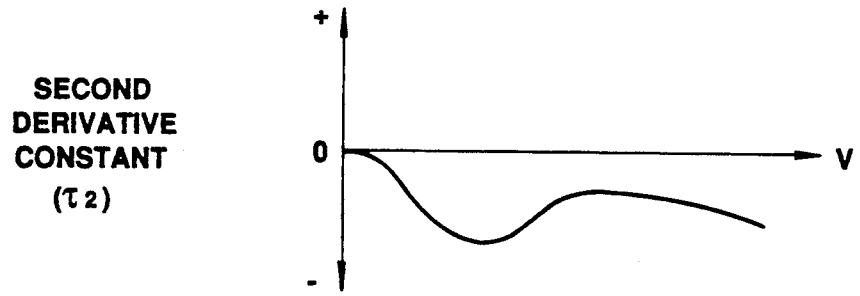
Figure 12:
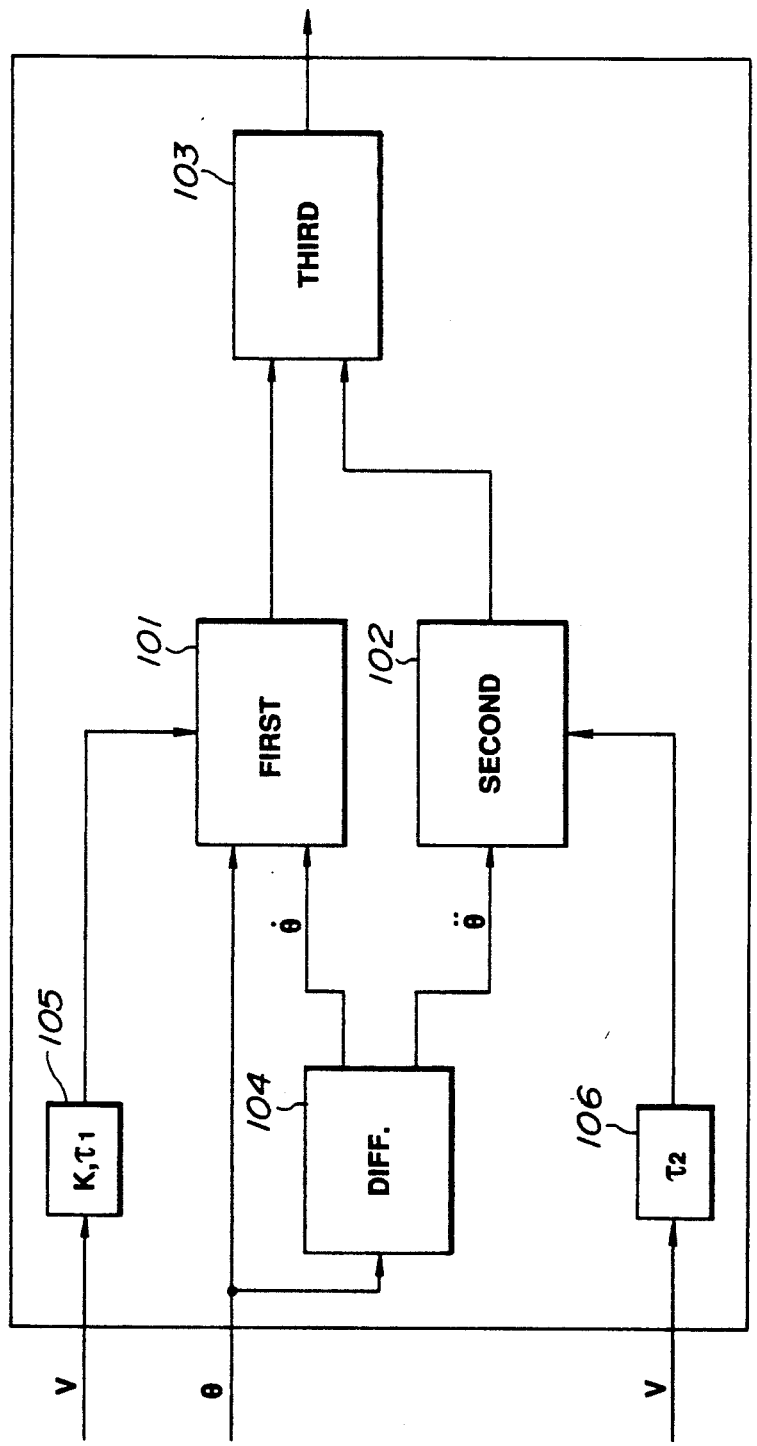
FIG. 12 is a diagram schematically showing functions of the controller 11 of the present invention.

FIGS. 9, 10 and 11 shows examples of the proportional constant, the first derivative constant and the second derivative constant which can be used in the control system of FIG. 1.

What is claimed is:

1. A rear wheel control steering system for a vehicle, comprising:
   a steering actuator for varying an actual rear wheel steering angle of said vehicle in response to a control signal; and a controller for producing said control signal said controller having first operational means for determining a first desired rear wheel steer angle so as to hold a yaw rate gain of said vehicle substantially constant in relation to a steering frequency, second operational means for determining a second desired rear wheel steer angle in accordance with steering acceleration proportional to a time rate of change of a steering speed which is a time rate of change of a front wheel steer angle, a third operational means for adding said second desired rear wheel steer angle to said first desired rear wheel steer angle, a steering input sensor for sensing a steering input of said vehicle, said controller being connected with said steering input sensor, and first differentiating means for determining a steering speed which is substantially equal to a first derivative of said steering input with respect to time, second differentiating means for determining said steering acceleration which is substantially equal to a second derivative of said steering input with respect to time, and wherein said first operational means is connected with said first differentiating means and determines said first desired rear wheel steer angle in accordance with said steering input and said steering speed, and said second operational means is connected with said second differentiating means.

2. A control system according to claim 1 wherein said first operational means has such a characteristic that said first desired rear wheel steer angle is proportional to a linear combination of said steering input and said steering speed, and said second operational means has such a characteristic that said second desired rear wheel steer angle is proportional to said steering acceleration.

3. A control system according to claim 2 wherein said second desired rear wheel steer angle is equal to a product obtained by multiplying said steering acceleration by a second derivative constant which is negative.

4. A control system according to claim 3 wherein said control system further comprises a vehicle speed sensor for sensing a vehicle speed of said vehicle, said vehicle speed sensor being connected with said controller, and wherein said controller further comprises means for determining a proportional constant in accordance with said vehicle speed, means for determining a first derivative constant in accordance with said vehicle speed, and means for determining said second derivative constant in accordance with said vehicle speed, and said first operational means determines said first desired rear wheel steer angle by adding said steering input multiplied by said proportional constant and said steering speed multiplied by said first derivative constant.

5. A control system according to claim 4 wherein said steering input sensor is a sensor for sensing a steering wheel angle of said vehicle.

6. A rear wheel steering control system of an automobile, comprising:
    a steering actuator for varying an actual rear wheel steer angle of said vehicle in response to a control signal;
    a steering input sensor for sensing a steering input of said vehicle; and
    a controller for producing said control signal, said controller being connected with said steering input sensor, said controller comprising:

first operational means for determining a first desired rear wheel steer angle so as to hold a yaw rate gain of said vehicle substantially constant;

second operational means for determining a second desired rear wheel steer angle in accordance with a steering acceleration;

third operational means for adding said second desired rear wheel steer angle to said first desired rear wheel steering angle;

first differentiating means for determining a steering speed which is substantially equal to a first derivative of said steering input with respect to time; and second differentiating means for determining said steering acceleration which is substantially equal to a second derivative of said steering input with respect to time, and wherein said first operational means is connected with said first differentiating means and determines said first rear wheel steer angle in accordance with said steering input and said steering speed, and said second operational means is connected with said second differentiating means.

7. A control system according to claim 6, wherein said first operational means has such a characteristic that said first desired rear wheel steer angle is proportional to a linear combination of said steering input and said steering speed, and said second operation means has such a characteristic that said second desired rear wheel steer angle is proportional to said steering acceleration.

8. A control system according to claim 7, wherein said second desired rear wheel steer angle is equal to a product obtained by multiplying said steering acceleration by a negative second derivative constant.

9. A control system according to claim 8, wherein said control system further comprises a vehicle speed sensor for sensing the speed of said vehicle, said vehicle speed sensor being connected with said controller, and wherein said controller further comprises means for determining a proportional constant in accordance with said vehicle speed, means for determining a first derivative constant in accordance with said vehicle speed, and means for determining said second derivative constant in accordance with said vehicle, said first operational means determining said first desired rear wheel steering angle by adding said steering input multiplied by said proportional constant and said steering speed multiplied by said first derivative constant.

10. A control system according to claim 9, wherein said steering input sensor senses the steering wheel angle of said vehicle.

11. A rear wheel steering control system for a vehicle, comprising:
    a steering actuator for steering the rear wheel of a vehicle in response to a control signal representing a desired rear wheel steer angle;
    a steering input sensor for sensing a steering input of said vehicle; and
    a controller which is connected with said steering input sensor, and which produces said control signal representing said desired rear wheel steering angle which is equal to the sum of a first term determined in accordance with said steering input, and a second term substantially proportional to a second derivative of said steering input with respect to time.

12. A control system according to claim 11, wherein said controller comprises a means for determining said second term which is substantially equal to the product obtained by multiplying said second derivative of said steering input by a negative second derivative constant.

13. A control system according to claim 11, wherein said control system further comprises a vehicle speed sensor for sensing the vehicle speed of said vehicle, said vehicle speed sensor being connected to said controller, and wherein said controller further comprises a means, connected with said vehicle speed sensor, for determining a second derivative constant in accordance with said vehicle speed, and a means for determining said second term which is substantially equal to a product obtained by multiplying said second derivative of said steering input by said second derivative constant.

14. A rear wheel steering control system for a vehicle, comprising:
   a steering actuator for steering the rear wheels of said vehicle in response to a control signal representing a desired rear wheel steer angle;
   a steering input sensor for sensing a steering input of said vehicle, and a controller which is connected with said steering input sensor, and which produces said control signal representing said desired rear wheel steer angle which is equal to a sum of a first term determined in accordance with said steering input, said first term being equal to a sum of a first product obtained by multiplying said steering input by a proportional constant, and a second product obtained by multiplying a steering speed which is substantially equal to a time rate of change of said steering input by a first derivative constant, and said second term is equal to a third product obtained by multiplying a steering acceleration which is substantially equal to a time rate of change of said steering speed by a second derivative constant, a second term substantially proportional to a second derivative of said steering input with respect to time, wherein said control system further includes a vehicle speed sensor being connected with said controller, each of said proportional first derivative and second derivative constants being a function of said vehicle speed.

* * * * *